(12) United States Patent
Ofuji et al.

(10) Patent No.: US 7,024,191 B2
(45) Date of Patent: Apr. 4, 2006

(54) MOBILE STATION APPARATUS, MOBILE COMMUNICATION SYSTEM, AND CARRIER DETECTING METHOD

(75) Inventors: Yoshiaki Ofuji, Yokosuka (JP); Motohiro Tanno, Yokosuka (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 440 days.

(21) Appl. No.: 10/214,570

(22) Filed: Aug. 9, 2002

(65) Prior Publication Data

US 2003/0032441 A1    Feb. 13, 2003

(30) Foreign Application Priority Data

Aug. 9, 2001  (JP)  .............................. 2001-242353

(51) Int. Cl.
*H04Q 7/20* (2006.01)
(52) U.S. Cl. .................... 455/432.1; 455/434; 455/525
(58) Field of Classification Search ................ 455/455, 455/422, 432, 434, 429, 161.3, 161.1, 432.1, 455/525
See application file for complete search history.

(56) References Cited

U.S. PATENT DOCUMENTS

| | | | |
|---|---|---|---|
| 5,822,686 A * | 10/1998 | Lundberg et al. ........ 455/161.3 |
| 5,937,351 A | 8/1999 | Seekins et al. | |
| 5,974,042 A | 10/1999 | Frank et al. | |
| 6,205,193 B1 | 3/2001 | Solve et al. | |
| 6,205,334 B1 * | 3/2001 | Dent ........................... 455/434 |
| 6,418,318 B1 * | 7/2002 | Bamburak et al. .......... 455/455 |
| 2002/0100057 A1 * | 7/2002 | Brown ........................ 725/111 |
| 2003/0031238 A1 | 2/2003 | Li et al. | |

FOREIGN PATENT DOCUMENTS

| | | |
|---|---|---|
| CN | 1164311 | 11/1997 |
| EP | 1 069 794 | 1/2001 |
| JP | 001035649 A2 * | 9/2000 |
| WO | WO 96/16524 | 5/1996 |
| WO | WO 02/03717 | 1/2002 |

OTHER PUBLICATIONS

Mitchell, B.: "Variable Bandwidth RSSI Scanning", Motorola Technical Developments, Motorola Inc., Schaumburg, Illinois, US. vol. 28, Aug. 1996, pp. 22-24, XP000638408.

* cited by examiner

*Primary Examiner*—Tilahun Gesesse
*Assistant Examiner*—Tan Trinh
(74) *Attorney, Agent, or Firm*—Oblon, Spivak, McClelland, Maier & Neustadt, P.C.

(57) ABSTRACT

For detecting service carriers, a received power measuring section initially carries out received power measurement in a frequency band assigned to the system, a frequency limiting section limits a service carrier seeking frequency range to the vicinity of a frequency where thus measured received power exceeds a threshold, the received power measuring section measures the received power at a frequency where a service carrier may exist within this frequency range, and the controller chooses a frequency yielding a high measured received power as a service carrier candidate frequency. Then, the cell search executing section initially executes a cell search for this candidate frequency.

21 Claims, 9 Drawing Sheets

CASE JUST FAILING TO EXCEED THRESHOLD
IN PREVIOUS MEASUREMENT

CASE WITH CARRIER LOCATED
AT END OF MEASUREMENT RANGE

CASE CONTINUOUSLY
EXCEEDING THRESHOLD

CASE EXCEEDING
THRESHOLD ALONE

MOBILE STATION APPARATUS, MOBILE COMMUNICATION SYSTEM, AND CARRIER DETECTING METHOD

BACKGROUND OF THE INVENTION

1. Field of the Invention

In a mobile communication system employing a CDMA (Code Division Multiple Access) scheme, the present invention relates to a mobile station apparatus for carrying out a service carrier detecting process and an out-of-zone determining process in the mobile station apparatus, a mobile communication system, and a carrier detecting method.

2. Related Background Art

In a mobile communication system using a CDMA scheme, it is necessary for a mobile station apparatus to enable communications with a base station in charge of the in-zone cell immediately after being energized or moved, in order to obtain information required for the mobile station apparatus to shift to an in-zone standby state from the notice information transmitted by a service carrier. For enabling communications with the base station, the mobile station apparatus establishes synchronization with the base station, and specifies a scrambling code of the channel through which the base station transmits the notice information. Such a series of operations carried out by the mobile station apparatus are referred to as cell search in general.

Operations of a cell search will now be explained in brief. First, spread spectrum signals are received at a frequency of the service carrier, and a signal having traveled a specific channel (PSCH) among thus received spread spectrum signals is fed into a matched filter, whereby a slot timing is detected. Subsequently, using thus detected slot timing and a specific channel (S.SCH), a frame timing and a scrambling code group are specified. Using this scrambling code group and a specific channel (CPICH), a scrambling code is specified. Further, a signal having traveled a specific channel (BCCH) is subjected to reverse-spreading by use of the specified scrambling code, whereby cell-specific information reported to all the mobile station apparatus within the cell is acquired. According to this information, the mobile station apparatus shifts to the in-zone standby state.

In cases where no information can be acquired, no scrambling code can be specified, or no synchronization can be detected after carrying out a series of cell search operations, the mobile station apparatus turns back the cell search procedure to the slot timing detection, and intermittently repeats a series of operations until the information is acquired upon reverse-spreading. If it is determined that the frequency subjected to the cell search differs from the frequency at which the base station transmits a signal, a cell search will be carried out at another frequency. Here, the mobile station apparatus will be in an out-of-zone state during when information of the base station cannot be acquired upon reverse-spreading.

When the frequency of a service carrier has not been specified in the mobile station apparatus, it must be specified before carrying out a cell search. This operation of the mobile station apparatus for specifying the frequency of a service carrier is referred to as carrier search.

In conventional mobile communication systems using CDMA schemes, mobile station apparatus have detected service carriers by executing cell searches at all the frequencies where carriers specified by the systems can be set.

Meanwhile, the specification of FDD scheme proposed by a group known as 3GPP (3rd Generation Partnership Project) requires that frequencies capable of setting carriers be arranged at frequency intervals of 200 kHz within a bandwidth of 60 MHz for each of uplinks and downlinks. Therefore, when one wishes to use a roaming service abroad from another provider, for example, it may take a considerable time to detect a service carrier used by this provider, and the power consumption required for a cell search may become enormous.

If roaming services between providers are limited while the number of kinds of carrier frequencies at which the mobile station apparatus can receive the services is very small as have been heretofore, cell searches may be carried out sequentially at these service carrier frequencies kept beforehand in a storage device of the mobile station apparatus without carrying out carrier searches in particular, so as to detect service carriers.

SUMMARY OF THE INVENTION

However, as roaming contracts between providers including international roaming increase along with the global standardization of mobile communication systems, the mobile station apparatus must keep a very large quantity of frequency information of service carriers within its storage device in the conventional carrier detecting methods, so that carrying out cell searches one by one in these frequencies eventually takes much time and power consumption, which is not efficient.

The cell searches carried out by a conventional mobile station apparatus have been executed sequentially at all the frequencies capable of setting carriers specified in the system. Therefore, there are cases where a considerable number of cell searches are necessary until a service carrier is detected or until an out-of-zone determination is carried out, which takes a considerable time for shifting to an in-zone standby state.

Also, as explained above, the power consumed by the reverse-spreading executed in a cell search operation is relatively large. In particular, the power consumption required for activating a matched filter in the procedure of detecting the slot timing takes a large proportion. Hence, the power consumption increases as cell searches are repeated, which may shorten the continuous standby time of the mobile station apparatus.

In view of such points, it is an object of the present invention to provide a mobile station apparatus, a mobile communication system, and a carrier detecting method which can efficiently carry out carrier searches, so as to shorten the time required for detecting a service carrier, and reduce the number of unnecessary cell search operations, so as to cut down the power consumption, thereby elongating the continuous standby time.

For overcoming the above-mentioned problem, the mobile station apparatus of the present invention is a mobile station apparatus for detecting a carrier containing information necessary for a base station apparatus employing a CDMA scheme to shift to an in-zone standby state, the mobile station apparatus comprising measuring means for measuring a received power; limiting means for limiting a frequency range for seeking the carrier according to the measured received power; control means for choosing a plurality of frequencies in the limited frequency range as candidates for the carrier; and search means for carrying out a cell search for a plurality of frequencies chosen as the candidates so as to detect the carrier.

In this configuration, since a cell search is carried out after a frequency at which a carrier may exist is estimated according to the received power measurement (electric field intensity measurement), efficient carrier detection and out-of-zone measurement can be carried out while omitting unnecessary cell searches, and the power consumption required for reverse-spreading in the cell search procedure can greatly be cut down, which can elongate the standby time of the mobile station apparatus.

Preferably, in the mobile station apparatus of the present invention, the control means selects a plurality of frequencies from within a frequency band where the carrier is assumed to exist, the measuring means measures a received power with a given bandwidth for each of the selected frequencies, and the limiting means limits the frequency range for seeking the carrier to the vicinity of a frequency where the measured received power exceeds a predetermined threshold.

In this configuration, since a received power is measured with a given bandwidth for each of a plurality of frequencies selected from within a frequency band where the carrier is assumed to exist, whereas the frequency range for seeking the carrier is limited to a frequency where thus measured received power exceeds a predetermined threshold, an accurate carrier seeking frequency range can be defined while cutting down the measuring process.

Preferably, in the mobile station apparatus of the present invention, when the measured received power does not exceed a predetermined threshold, so that the limiting means fails to limit the frequency range, the control means selects another frequency, and the measuring means measures a received power with a given bandwidth for each of the selected frequencies.

This configuration can limit the frequency range for seeking the carrier so that no carrier is left undetected from the frequency band where the carrier is assumed to exist.

Preferably, in the mobile station apparatus of the present invention, the control means chooses as a candidate for the carrier a received signal frequency exceeding a predetermined power from within the frequency range limited by the limiting means.

In this configuration, since a received signal frequency exceeding a predetermined power is employed as a candidate for the carrier, a candidate for the carrier can be chosen appropriately.

Preferably, in the mobile station apparatus of the present invention, the control means chooses as candidates for the carrier a plurality of adjacent received signal frequencies exceeding a predetermined power from within the frequency range limited by the limiting means.

In this configuration, since the received power near a carrier frequency exhibits a certain level, a carrier candidate can efficiently be selected if some adjacent received signal frequencies exceeding a predetermined power are employed as candidates for the carrier.

Preferably, in the mobile station apparatus of the present invention, when notice information is received upon a cell search for a plurality of frequencies chosen as the candidates, the search means defines a received frequency thereof as a frequency of the carrier, while no cell search is carried out for the other candidate frequencies.

In this configuration, efficient carrier detection and out-of-zone measurement can be carried out while omitting a greater number of unnecessary cell searches, and the power consumption required for reverse-spreading in the cell search procedure can greatly be cut down, which can elongate the standby time of the mobile station apparatus.

Preferably, in the mobile station apparatus of the present invention, when the received power measured by the measuring means is not higher than a predetermined threshold, the control means determines that the mobile station apparatus is located out of a zone.

In this configuration, the fact that the mobile station apparatus is located outside a wireless coverage area of a base station apparatus can be recognized instantly, whereby it does not take time to recognize an out-of-zone state, which has conventionally taken time and increased the power consumption. In other words, the power consumption can be cut down, whereby the standby time of the mobile station apparatus can be elongated.

Preferably, in the mobile station apparatus of the present invention, the measuring means carries out a plurality of received power measuring operations with a given time interval for each frequency when measuring a received power, averages thus measured results for each frequency, and employs thus obtained average for each frequency as a measurement result at the frequency.

This configuration makes it possible to measure a received power while effectively reducing the influence of fluctuations in received power caused by multipath fading and the like.

Preferably, in this case, during an interval of received power measuring operations for one frequency, the measuring means measures a received power for another frequency.

This configuration can shorten the time for measuring the received power while effectively reducing the influence of fluctuations in received power caused by multipath fading and the like.

Preferably, in the mobile station apparatus of the present invention, while in a state where the existence of at least one carrier is verified, the control means excludes the whole frequency band occupied by the verified carrier from a search range when detecting another carrier.

In cases where at least one carrier frequency recognized by the mobile station apparatus is a service carrier of another provider, and the like, it is necessary to seek another carrier. In such cases, the whole frequency band occupied by the verified carrier is excluded from a search range in the configuration mentioned above, whereby another carrier can be sought rapidly.

For overcoming the above-mentioned problem, the mobile communication system of the present invention comprises one of the mobile station apparatus mentioned above, and a base station apparatus for carrying out a wireless communication with the mobile station apparatus.

This configuration can attain an effect similar to that of any of the above.

For overcoming the above-mentioned problem, the carrier detecting method of the present invention is a carrier detecting method for detecting in a mobile station apparatus a carrier containing information necessary for a base station apparatus employing a CDMA scheme to shift to an in-zone standby state, the method comprising a measuring step of measuring a received power; a limiting step of limiting a frequency range for seeking the carrier according to the received power measured in the measuring step; a control step of choosing a plurality of frequencies in the frequency range limited by the limiting step as candidates for the carrier; and a search step of carrying out a cell search for a plurality of frequencies chosen as the candidates in the limiting step so as to detect the carrier.

In this method, since a cell search is carried out after a frequency at which a carrier may exist is estimated according to the received power measurement (electric field intensity measurement), efficient carrier detection and out-of-zone measurement can be carried out while omitting unnecessary cell searches, and the power consumption required for reverse-spreading in the cell search procedure can greatly be cut down, which can elongate the standby time of the mobile station apparatus.

Preferably, in the carrier detecting method of the present invention, the control step selects a plurality of frequencies from within a frequency band where the carrier is assumed to exist, the measuring step measures a received power with a given bandwidth for each of the selected frequencies, and the limiting step limits the frequency range for seeking the carrier to the vicinity of a frequency where the measured received power exceeds a predetermined threshold.

In this method, since a received power is measured with a given bandwidth for each of a plurality of frequencies selected from within a frequency band where the carrier is assumed to exist, whereas the frequency range for seeking the carrier is limited to a frequency where thus measured received power exceeds a predetermined threshold, an accurate carrier seeking frequency range can be defined while cutting down the measuring process.

Preferably, in the carrier detecting method of the present invention, when the received power measured in the measuring step does not exceed a predetermined threshold, so that the limiting step fails to limit the frequency range, the control step selects another frequency, and the measuring step measures a received power with a given bandwidth for each of the selected frequencies.

This method can limit the frequency range for seeking the carrier so that no carrier is left undetected from the frequency band where the carrier is assumed to exist.

Preferably, in the carrier detecting method of the present invention, the control step chooses as a candidate for the carrier a received signal frequency exceeding a predetermined power from within the frequency range limited by the limiting step.

In this method, since a received signal frequency exceeding a predetermined power is employed as a candidate for the carrier, a candidate for the carrier can be chosen appropriately.

Preferably, in the carrier detecting method of the present invention, the control step selects a plurality of adjacent received signals exceeding a predetermined power from within the frequency range limited by the limiting step.

In this method, since the received power near a carrier frequency exhibits a certain level, a carrier candidate can efficiently be selected if some adjacent received signal frequencies exceeding a predetermined power are employed as candidates for the carrier.

Preferably, in the carrier detecting method of the present invention, when notice information is received upon a cell search for a plurality of frequencies chosen as the candidates, the search step defines a received frequency thereof as a frequency of the carrier, while no cell search is carried out for the other candidate frequencies.

In this method, efficient carrier detection and out-of-zone measurement can be carried out while omitting a greater number of unnecessary cell searches, and the power consumption required for reverse-spreading in the cell search procedure can greatly be cut down, which can elongate the standby time of the mobile station apparatus.

Preferably, in the carrier detecting method of the present invention, when the received power measured in the measuring step is not higher than a predetermined threshold, the control step determines that the mobile station apparatus is located out of a zone.

In this method, the fact that the mobile station apparatus is located outside a wireless coverage area of a base station apparatus can be recognized instantly, whereby it does not take time to recognize an out-of-zone state, which has conventionally taken time and increased the power consumption. In other words, the power consumption can be cut down, whereby the standby time of the mobile station apparatus can be elongated.

Preferably, in the carrier detecting method of the present invention, the measuring step carries out a plurality of received power measuring operations with a given time interval for each frequency when measuring a received power, averages thus measured results for each frequency, and employs thus obtained average for each frequency as a measurement result at the frequency.

This method makes it possible to measure a received power while effectively reducing the influence of fluctuations in received power caused by multipath fading and the like.

Preferably, in this case, during an interval of received power measuring operations for one frequency, the measuring step measures a received power for another frequency.

This method can shorten the time for measuring the received power while effectively reducing the influence of fluctuations in received power caused by multipath fading and the like.

Preferably, in the carrier detecting method of the present invention, while in a state where the existence of at least one carrier is verified, the control step excludes the whole frequency band occupied by the verified carrier from a search range when detecting another carrier.

In cases where at least one carrier frequency recognized by the mobile station apparatus is a service carrier of another provider, and the like, it is necessary to seek another carrier. In such cases, the whole frequency band occupied by the verified carrier is excluded from a search range in the configuration mentioned above, whereby another carrier can be sought rapidly.

The present invention will be more fully understood from the detailed description given hereinbelow and the accompanying drawings which are given by way of illustration only, and thus are not to be considered as limiting the present invention.

DESCRIPTION OF THE PREFERRED EMBODIMENTS

In the following, embodiments of the present invention will be explained in detail with reference to the drawings.

First Embodiment

Figure 1:
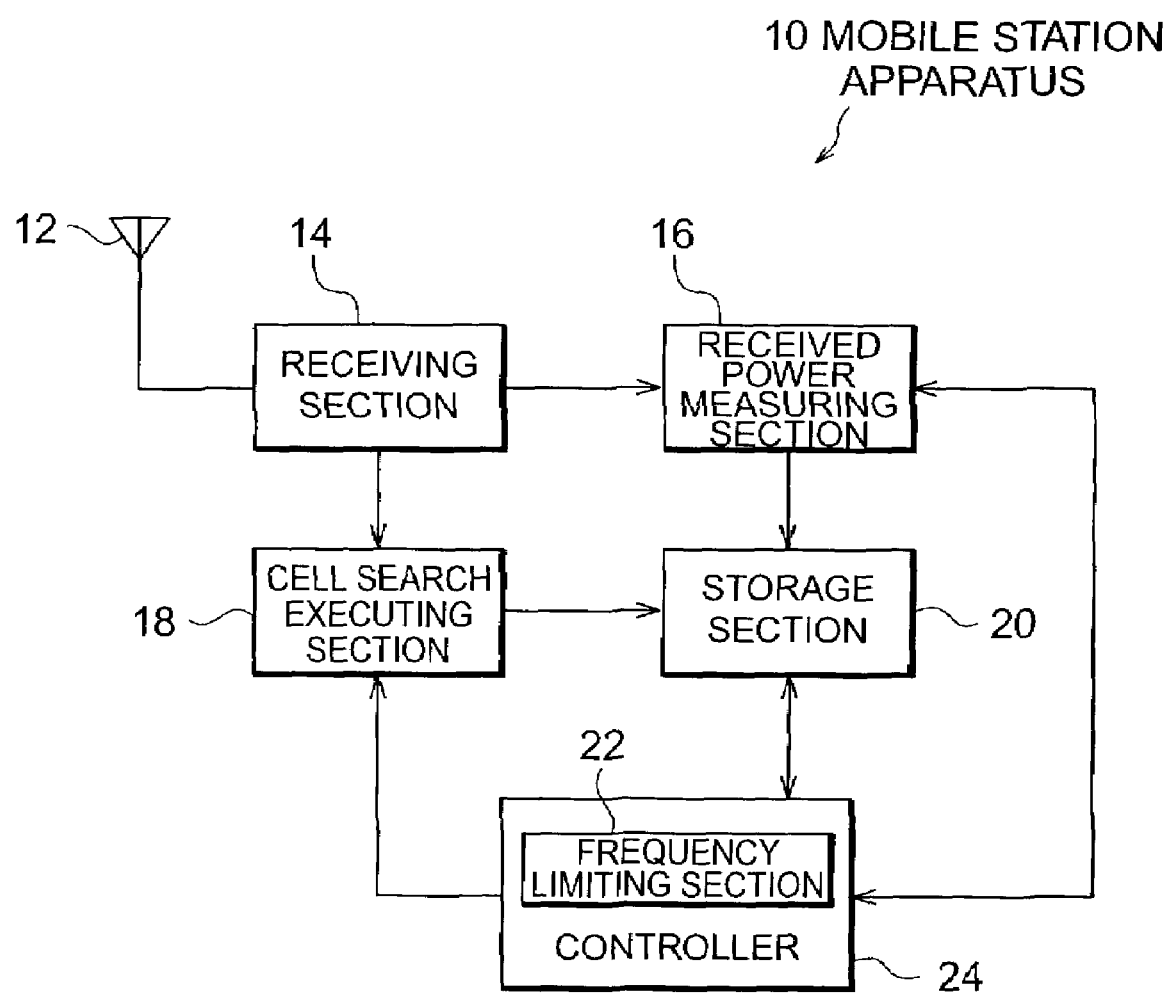
FIG. 1 is a block diagram showing the configuration of a mobile station apparatus in accordance with the first embodiment of the present invention.

FIG. 1 is a block diagram showing the configuration of a mobile station apparatus in accordance with a first embodiment of the present invention.

The mobile station apparatus 10 shown in FIG. 1 comprises an antenna 12, a receiving section 14, a received power measuring section 16, a cell search executing section 18, a storage section 20, and a controller 24 including a frequency limiting section 22. The individual constituents will be explained in detail in the following.

The antenna 12 has a receiving characteristic with a bandwidth sufficient for receiving a spread spectrum signal transmitted from a base station. The receiving section 14 carries out receiving processes such as down-converting and reverse-spreading of signals received by the antenna 12.

The received power measuring section 16 measures the received power at a frequency and a measurement bandwidth which are designated by the controller 24, and reports thus measured value to the controller 24.

The cell search executing section 18 carries out a cell search at the frequency designated by the controller 24.

The storage section 20 is used for keeping frequency information of a carrier from which the mobile station apparatus 10 can receive services, information of the detected service carrier, results of measurement of received power, and the like temporarily or eternally depending on the details of information.

The controller 24 controls each of the above-mentioned sections, whereas the frequency limiting section 22 limits the range of cell search. The mobile station apparatus 10 is assumed to comprise all the mechanisms the mobile station apparatus should be equipped with in addition to the constituents mentioned above.

Figure 2:
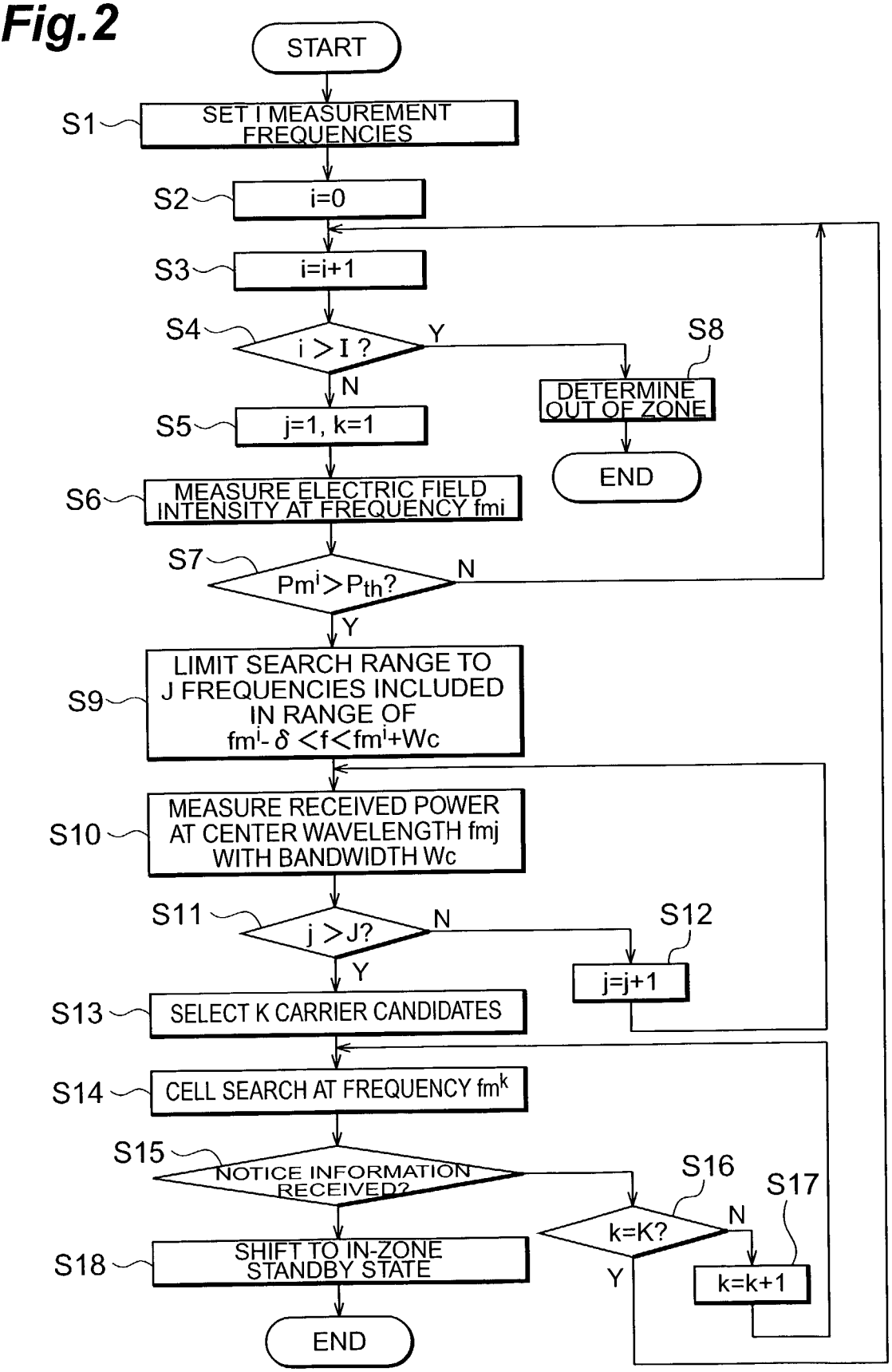
FIG. 2 is a flowchart showing the procedure of carrier search operations in accordance with the first embodiment.

A procedure of carrier search operations performed by thus configured mobile station apparatus 10 will be explained with reference to the flowchart shown in FIG. 2.

Figure 3:
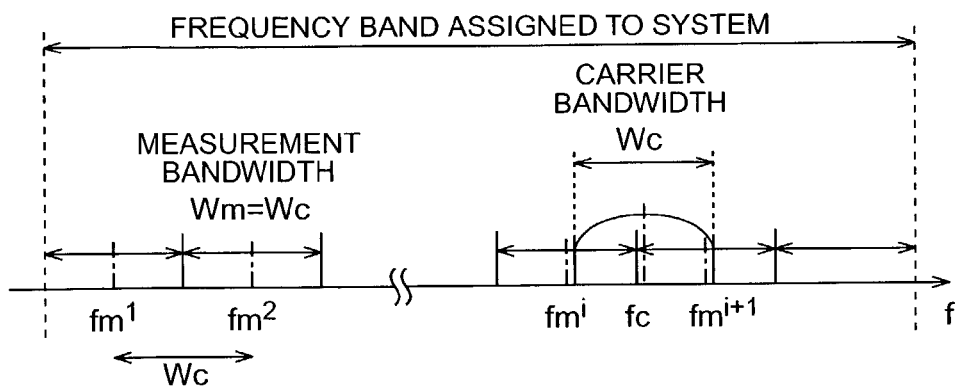
FIG. 3 is a view for explaining received power measurement frequencies and measurement bandwidths assumed in the first stage of the carrier search procedure in accordance with the first embodiment.

To begin with, the controller 24 sets I measurement frequencies at step S1 for the received power measurement in the first stage of carrier search procedure. Namely, combinations of measurement frequencies fm and measurement bandwidths Wm are determined. While various combinations of fm and Wm are possible, an embodiment where the measurement frequencies are those with a measurement interval defined by $fm^{i+1}-fm^i=Wc$ and a measurement bandwidth of $Wm=Wc$ as shown in FIG. 3 will be explained here.

Here, Wc indicates the bandwidth occupied by a service carrier (carrier bandwidth), fc indicates the center frequency, and $fm^i$ indicates the i-th measurement frequency from the lowest frequency.

Subsequently, i=0 at step S2, i=i+1 at step S3, and it is determined whether i>I or not at step S4. If i>I does not hold in the result, then j=1 and k=1 at step S5, and thereafter, at step S6, the received power measuring section 16 carries out received power measurement (electric field intensity measurement) with the measurement bandwidth Wc from $fm^1$ in the measurement frequencies set at steps S2 to S5. Upon the measurement at step S6, a sufficient measuring period is provided or several measuring operations are repeated, and so forth, so as to carry out such averaging that influences of fading and the like can be corrected.

At subsequent step S7, the controller 24 compares the measurement result $Pm^i$ at the frequency $fm^i$ with a preset threshold $P_{th}$. If $Pm^i$ is $P_{th}$ or smaller as a result, the value of i is incremented by 1 at step S3, and measurement is carried out at the next frequency $fm^{i+1}$. If there is no measurement result exceeding the predetermined threshold with respect to the measurement frequencies set by the first stage, i.e., i>I at step S4, then the controller 24 determines that it is out of the zone at step S8. Here, measurement may be carried out again with measurement frequencies being set to frequencies different from those initially set by the first stage.

If the result of comparison at step S7 is $Pm^i>P_{th}$, then it is determined that a service carrier exists near that frequency. In this case, the carrier frequency and measurement frequency seem to have a relationship shown in FIG. 4, whereby the range of existence of service carrier can be set to $fm^i-\delta<f<fm^i+Wc$. This is the range between the respective cases shown in (a) and (b) of FIG. 4.

Consequently, at subsequent step S9, the frequency limiting section 22 limits the service carrier seeking range (search range) to J frequencies included in the frequency range of $fm^i-\delta<f<fm^i+Wc$, where service carriers may exist. Here, δ is a margin for preventing service carriers from being left undetected in the subsequent second stage.

Figure 4A:
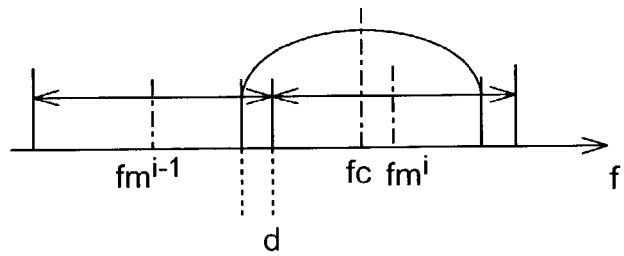
FIG. 4 is a view for explaining how to limit a service carrier seeking range in the first stage of the carrier search procedure in accordance with the first embodiment.
Figure 4B:
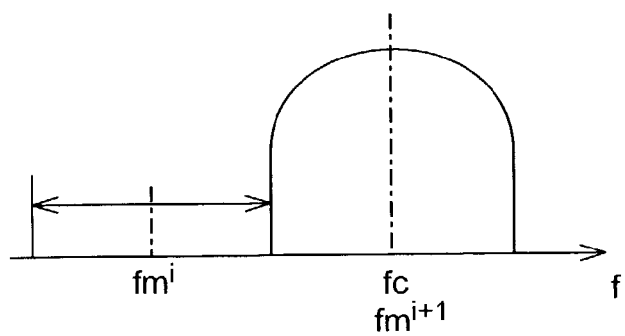

The margin δ is provided because of the fact that there is a possibility of carriers being left undetected in cases where the measurement range and carrier have a positional relationship such as that of the measurement frequency $fm^{i-1}$ of FIG. 4(a) while the carrier power is weak at a cell end and the like. If a carrier exists on the lower frequency side than the frequency range mentioned above, it can be assumed that $Pm^{i-1}>P_{th}$ upon measuring a received power at the frequency $fm^{i-1}$. Here, "frequencies where service carriers may exist" refer to frequencies capable of setting carriers defined in this system.

Subsequently as a second stage, assuming that the number of frequencies limited above is J, the received power measuring section 16 successively measures the respective received powers with respect to the J frequencies in the loop of steps S10 to S12, and the results of measurement are stored into the storage section 20. Namely, at step S10, received power measurement is carried out with a center frequency $fm^j$ and the bandwidth Wc. If j=J does not hold at step S11, then j is incremented by 1 at step S12, measurement is carried out at step S10, and the result of measurement is stored. At the time when j=J, the flow proceeds to step S13.

Figure 5:
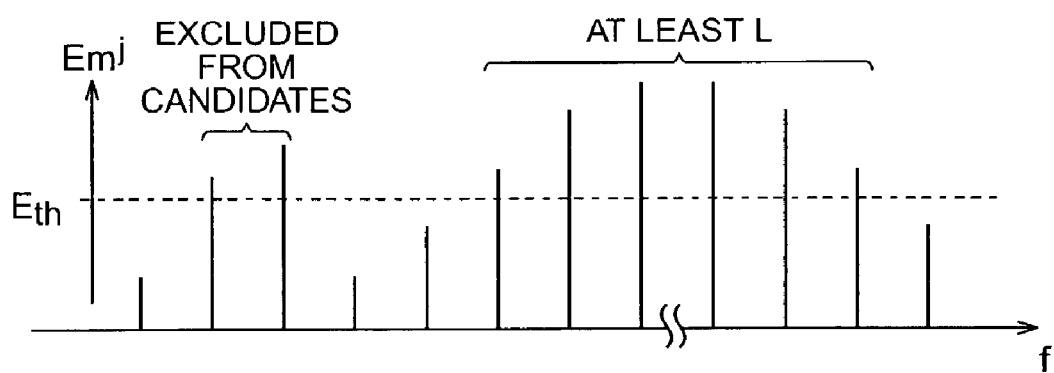
FIG. 5 is a view for explaining an example of how to select frequencies which become service carrier candidates in the second stage of the carrier search procedure in accordance with the first embodiment.

Subsequently, at step S13, the controller 24 refers to the measurement results stored in the storage section 20, selects K frequencies successively from the one having the highest reception level, and employs them as frequencies which become candidates for service carriers. If a carrier actually exists, then the result of received power measurement near the center frequency of the carrier is assumed to exhibit a certain level. Therefore, for example, it is desirable that service carrier candidate frequencies be preferentially chosen from frequencies whose received power level $Em^j$ exceeds a threshold $E_{th}$ in at least L adjacent measurement frequencies as shown in FIG. 5, where L is an appropriate integer.

As a third stage, in the loop of steps S14 to S17, the cell search executing section 18 sequentially carries out cell searches for the service carrier candidate frequencies, thereby attempting to acquire information included in notice information for shifting to an in-zone standby state. Namely, at step S14, a cell search is carried out at a center frequency $fm^k$. If no notice information is received at step S15, it is determined whether k=K or not at step S16. If k=K does not hold, then k is incremented by 1 at step S17, and a cell search is carried out at step S14. At the time when the necessary information is acquired due to this operation, the mobile station apparatus 10 stops the carrier search and cell search operations at step S15, thereby shifting to an in-zone standby state at step S18.

If no information for shifting to the in-zone standby state is obtained after executing cell searches for all the service carrier frequency candidates selected in the second stage, then the flow shifts from step S15 to S16. If k=K at the latter step, then the flow returns to the measurement in the first stage (step S3) of the carrier search procedure, and measurement is restarted at the next frequency. If no other measurement frequencies set at the first stage are left, then it is determined out of the zone here.

Thus, for detecting a service carrier in the mobile station apparatus of the first embodiment, the received power measuring section 16 initially measures a received power in a frequency band assigned to this system, the frequency limiting section 22 limits a service carrier seeking frequency range to the vicinity of a frequency where the measured received power exceeds a threshold, the received power measuring section 16 measures the respective received powers of frequencies where the service carrier may exist in this frequency range, and the controller 24 chooses a frequency yielding a large measured received power as a service carrier candidate. Then, the cell search executing section 18 initially attempts a cell search for this candidate frequency.

As a consequence, in the first embodiment, no cell search is carried out for frequencies where it is determined that no carrier exists, whereby the power consumption of the mobile station apparatus can be suppressed, and service carriers enabling standby can efficiently be detected.

Second Embodiment

Figure 6:
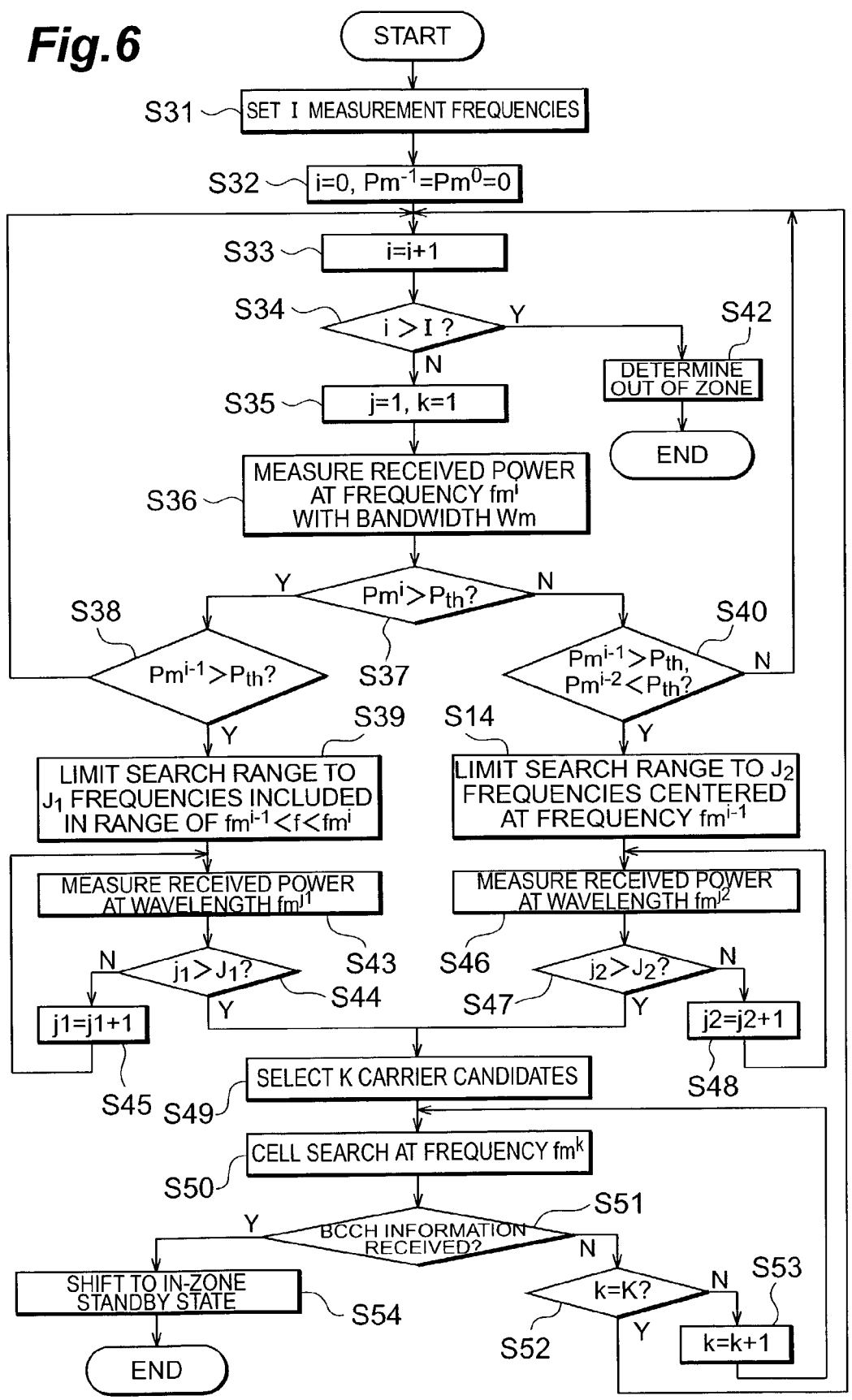
FIG. 6 is a flowchart for explaining the procedure of carrier search operations carried out by the mobile station apparatus in accordance with the second embodiment of the present invention.

FIG. 6 is a flowchart for explaining a procedure of carrier search operations carried out by the mobile station apparatus in accordance with a second embodiment of the present invention.

Figure 7:
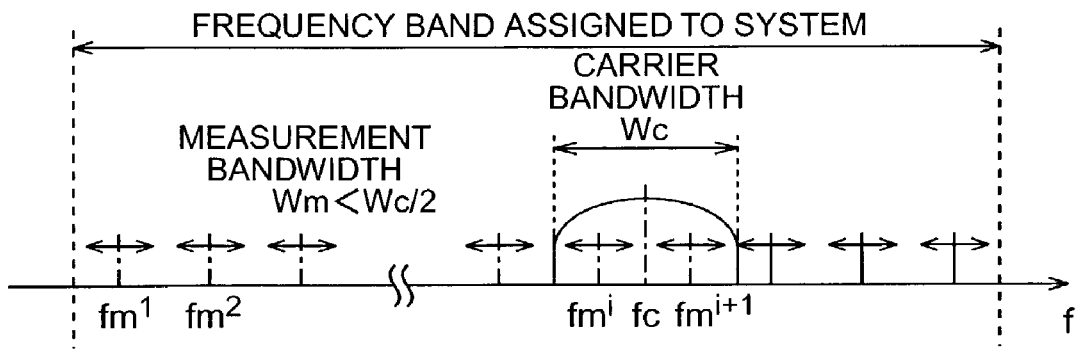
FIG. 7 is a view for explaining received power measurement frequencies and measurement bandwidths assumed in the first stage of the carrier search procedure in accordance with the second embodiment.

A carrier search procedure in the case where measurement frequencies are those with a measurement interval of $fm^i - fm^{i-1} = Wc/2$ and a measurement bandwidth of $Wm<Wc/2$ for the received power measurement in the first stage of carrier search procedure as shown in FIG. 7 will be explained in the second embodiment. The mobile station apparatus is composed of the same constituents as those of the mobile station apparatus 10 in accordance with the first embodiment shown in FIG. 1.

Initially, measurement frequencies of the first stage are set according to the rule mentioned above. Namely, at step S31, the controller sets I measurement frequencies. At step S32, i=0, and the received power level $Pm^{-1}=Pm^0=0$. At step S33, i=i+1. At step S34, it is determined whether i>1 or not. If i>1 does not hold in the result, then j=1 and k=1 at step S35, and thereafter the received power measuring section carries out received power measurement (electric field power measurement) at a center frequency $fm^i$ with a measurement bandwidth Wm at step S36.

Figure 8A:
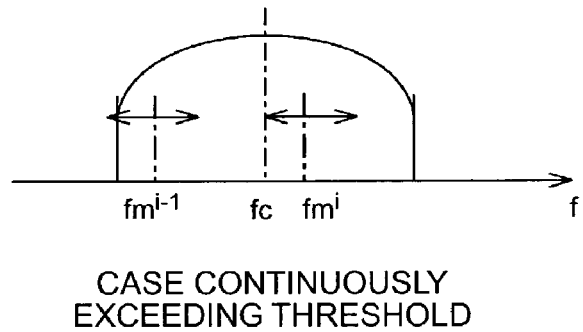
FIG. 8 is a view for explaining how to limit a service carrier seeking range in the first stage of the carrier search procedure in accordance with the second embodiment.
Figure 8B:
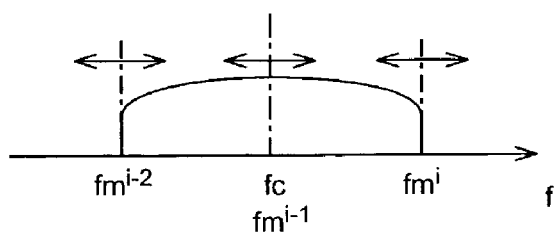

Subsequently, at step S37, the controller determines whether $Pm^i>P_{th}$ in the measurement result or not. Here, depending on how the measurement result exhibiting $Pm^i>P_{th}$ appears, the frequency limiting section limits the service carrier seeking range according to the two methods described in the following (1) and (2):

(1) When measurement results exceeding a threshold $E_{th}$ are continuously observed in adjacent measurement frequencies $fm^{i-1}$ and $fm^i$, i.e., when $Pm^{i-1}>P_{th}$ at step S38, the center frequency of a carrier and the measurement frequency are assumed to have the relationship shown in (a) of FIG. 8.

Therefore, assuming that a carrier frequency fc exists within the frequency range of $fm^{i-1}+Wm/2<fc<fm^i+Wm/2$ in this case, the service carrier seeking frequency range is limited to the range mentioned above, and further to frequencies (whose number is assumed to be $J_1$) where service carriers may exist in this range. Namely, at step S39, the frequency limiting section limits the cell search range to $J_i$ frequencies included in the range of $fm^{i-1}<f<fm^i$. Here, "frequencies where service carriers may exist" refer to frequencies capable of setting carriers defined in this system as in the first embodiment.

(2) When a measurement result exceeding the threshold $E_{th}$ is observed at a measurement frequency $fm^i$ alone in adjacent measurement frequencies, i.e., when $Pm^{i-1}>P_{th}$ and $Pm^{i-2}<P_{th}$ at step S40, the center frequency of a carrier and the measurement frequency are assumed to have the relationship shown in (b) of FIG. 8.

Therefore, assuming that the carrier frequency fc exists near $fm^i$ in this case, the service carrier seeking range is limited to $J_2$ frequencies centered at $fm^i$. Namely, at step S41, the frequency limiting section limits the cell search range to $J_2$ frequencies centered at $fm^{i-1}$.

If no measurement results exhibiting $Pm^i>P_{th}$ are obtained at any measurement frequency, it is determined at step S42 that the mobile station apparatus is located out of a zone.

In the second stage of the career search procedure, received power measurement is carried out for $J_1$ or $J_2$ frequencies falling within the seeking range limited by the first stage, so as to select K service carrier candidate frequencies as in the first embodiment.

Namely, at step S43, received power measurement is carried out at a frequency $fm^{j1}$. If $j_1=J_1$ does not hold at step S44, then $j_1$ is incremented by 1 at step S45, and the measurement at step S43 is carried out. At the time when $j_1=J^1$, K carrier candidates are selected at step S49. Similarly, at step S46, received power measurement is carried out at a frequency $fm^{j2}$. If $j_2=J_2$ does not hold at step S46, then $j_2$ is incremented by 1 at step S48, and the measurement at step S46 is carried out. At the time when $j_2=J_2$, K carrier candidates are selected at step S49.

In the third stage, the cell search executing section 18 carries out cell searches for the service carrier candidate frequencies selected by the second stage, thereby attempting to acquire information included in notice information for shifting to an in-zone standby state.

Namely, at step S50, a cell search is carried out at a center frequency $fm^k$. If no BCCH information is received at step S51, then it is determined whether k=K holds at step S52 or not. If k=K does not hold, then k is incremented by 1 at step S53, and the cell search at step S50 is carried out. At the time when the mobile station apparatus acquires necessary information at step S51, it stops the carrier search and cell search operations, thereby shifting to an in-zone standby state at step S54.

If no information for shifting to the in-zone standby state is obtained after executing cell searches for all the service carrier frequency candidates selected by the second stage, the flow shifts from step S51 to S52. If k=K at the latter step, then the flow returns to the measurement in the first stage (step S33) of the carrier search procedure, and measurement is restarted at the next frequency.

While using the same basic constituents as those of the first embodiment, the mobile station apparatus of the second embodiment reduces the measurement frequency interval of received power in the received power measuring section to one half of the carrier bandwidth and cuts down the measurement bandwidth to one half of the carrier bandwidth or less in the first stage of the carrier search procedure. As a consequence, the mobile station apparatus can reduce the number of frequencies measured in the second stage to one half that in the first embodiment or less.

Third Embodiment

Figure 9:
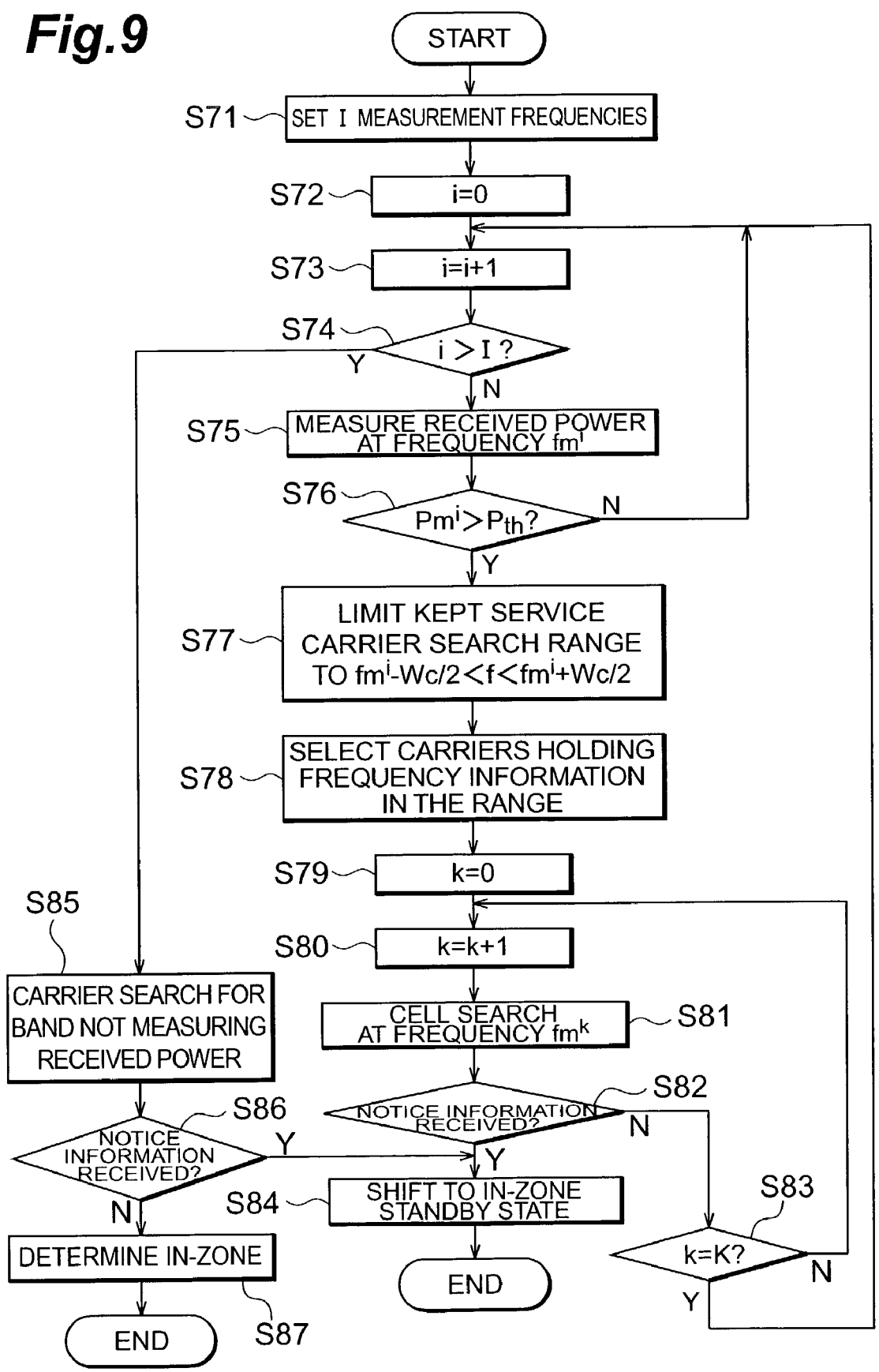
FIG. 9 is a flowchart for explaining the procedure of carrier search operations carried out by the mobile station apparatus in accordance with the third embodiment of the present invention.

FIG. 9 is a flowchart for explaining a procedure of carrier search operations carried out by the mobile station apparatus in accordance with a third embodiment of the present invention.

The third embodiment relates to a case where the mobile station apparatus is composed of the same constituents as those of the mobile station apparatus 10 in accordance with the first embodiment shown in FIG. 1, while assuming that frequency information of carriers from which services can be received is kept in the storage section.

Figure 10:
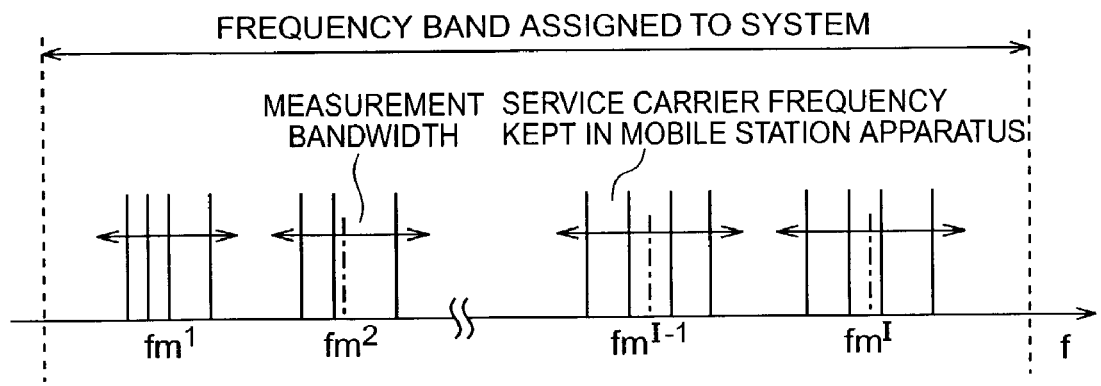
FIG. 10 is a view for explaining how to set received power measurement frequencies and measurement bandwidths in the first stage of the carrier search procedure in accordance with the third embodiment.

First, when the service carrier frequency information kept in the storage section of the mobile station apparatus is in the state shown in FIG. 10, measurement frequencies and measurement bandwidths of received power are set so as to include the frequencies of service carriers efficiently as depicted. Namely, at step S71, the controller sets I measurement frequencies. At step S72, i=0. At step S73, i=i+1. Here, it is unnecessary for the individual measurement frequencies to have a constant measurement bandwidth. Though not depicted, measurement frequencies and measurement bandwidths may also be set such that only a small number of service carrier frequencies are contained in a single measurement range in order to reduce the number of cell search operations in the later processing.

Subsequently, at step S74, it is determined whether i>I or not. If not, then the received power measuring section carries out received power measurement (electric field power measurement) at a center frequency $fm^i$ at step S75. It is determined at step S76 whether $Pm^i > P_{th}$ holds in the result of measurement or not. If a measurement result exhibiting $Pm^i > P_{th}$ is obtained, then the frequency limiting section limits the service carrier seeking range to the measurement bandwidth where $Pm^i > P_{th}$. Namely, at step S77, the service carrier cell search range kept in the storage section is limited to $fm^i - Wc/2 < f < fm^i + Wc/2$. If $Pm^i > P_{th}$, then the flow returns to step S73, and a received power is measured at the next measurement frequency.

Subsequently, the cell search executing section executes cell searches for the service carrier frequencies (whose number is assumed to be K) kept in the storage section and included in the measurement band limited at step S77. Namely, the controller selects carriers holding frequency information while falling within the above-mentioned range at step S78, sets k=0 at step S79, sets k=1 at step S80, and then carries out a cell search at $fm^k$ at step S81. If no notice information is received at step S82, then it is determined whether k=K holds or not at step S83. If not, then k is incremented by 1 at step S80, and the cell search at S81 is carried out. At the time when the mobile station apparatus acquires necessary information at step S82, it stops the carrier search and cell search operations, thereby shifting to an in-zone standby state at step S84, which terminates the processing.

If no measurement result exhibiting $Pm^i > P_{th}$ is obtained as a result of measurement in all the frequencies set until the initial step S76, carrier searches are executed for frequency bands other than those in which received powers have been measured so far, in order to detect unknown service carriers whose frequency information is not kept by the mobile station apparatus. Namely, at step S85, a carrier search is carried out for a band in which no received power has been measured. If no notice information is received at step S86, then it is determined out of zone at step S87, whereby the processing is terminated. If notice information is received at step S86, then the apparatus shifts to an in-zone standby state at step S84, thereby terminating the processing.

While using the same basic constituents as those of the first embodiment, the mobile station apparatus of the third embodiment keeps frequency information of carriers from which services can be received in its storage section, and carries out carrier searches by using this information, thus being able to cut down the number of frequencies to be measured as compared with the first embodiment.

Fourth Embodiment

Figure 11:
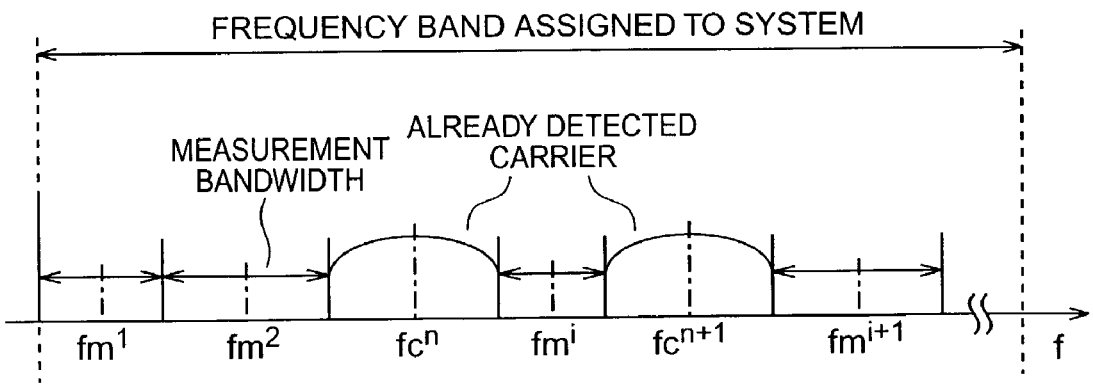
FIG. 11 is a view for explaining how to set received power measurement frequencies and measurement bandwidths in the first stage of the carrier search procedure in accordance with the fourth embodiment of the present invention.

FIG. 11 is a view for explaining how to set received power measurement frequencies and measurement bandwidths in a first stage of the carrier search procedure in accordance with a fourth embodiment of the present invention.

The fourth embodiment relates to the first stage of carrier search procedure, while assuming a case where a carrier used by a provider with which the mobile station apparatus has no roaming contract is detected as a result of a carrier search or a case where standby is rejected even though it is a carrier of a contracted provider.

In such a case, a carrier search is conducted again in order to detect a service carrier allowing standby used by a contracted provider or roaming-contracted provider of the mobile station apparatus. Here, the controller keeps frequency information of detected carriers, such as $fc^n$ and $fc^{n+1}$ shown in FIG. 11, and frequency information of other carriers obtained from the notice information of the former carriers in the storage section, and excludes the frequency bands occupied by these carriers from the range subjected to carrier searches.

Employing such a method of the fourth embodiment can efficiently detect service carriers allowing standby in the case where carriers not allowing standby are detected.

Fifth Embodiment

Figure 12:
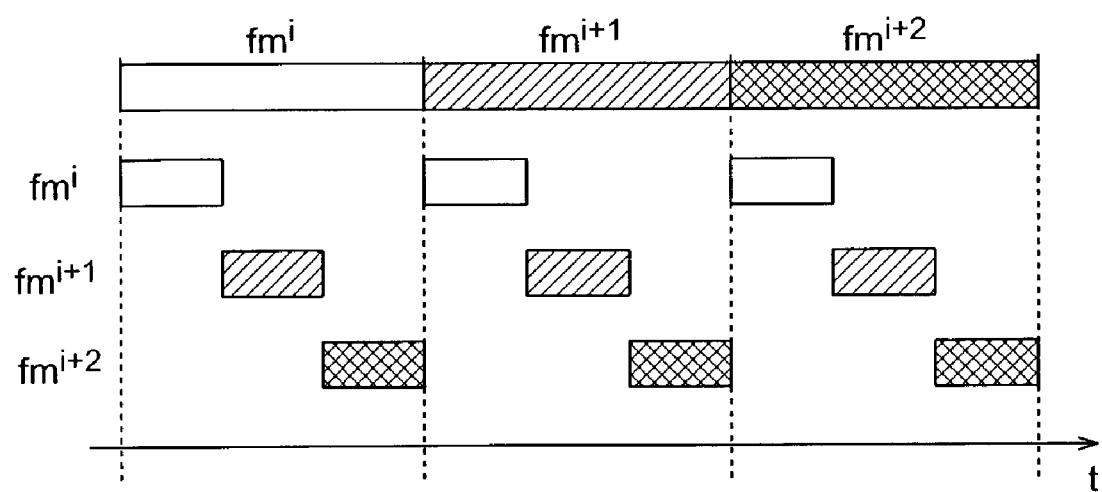
FIG. 12 is a view for explaining received power measuring methods in the first and second stages of the carrier search procedure in accordance with the fifth embodiment of the present invention.

FIG. 12 is a view for explaining received power measuring methods in first and second stages of the carrier search procedure in accordance with a fifth embodiment of the present invention.

When the received power measuring section measures a received power, the received electric field in the mobile station apparatus constantly fluctuates and is unstable under the influence of multipath fading and the like. As a consequence, for carrying out in-zone/out-of-zone determination according to the received power, correct determination cannot be effected unless averaging of time is carried out to a certain extent. While measurement results are known to become more accurate as the averaging time is longer in this kind of measurement in general, the accuracy in measurement is assumed to increase when averaging is carried out for individual measuring operations at frequencies $fm^i$, $fm^{i+1}$, and $fm^{i+2}$ at intervals even if the measurement time is held constant as shown in FIG. 12.

In the fifth embodiment, as shown in FIG. 11, several received power measuring operations are carried out with time intervals for the measurement at the frequency $fm^i$ as shown in FIG. 11, and all of them are averaged. During the intervals of the frequency measuring operations, measuring operations at other frequencies $fm^{i+1}$ and $fm^{1+2}$ are carried out in parallel, whereby highly accurate measurement is realized without increasing the measurement time in total.

As explained in the foregoing, since cell searches are carried out after received power measurement (electric field intensity measurement) estimates frequencies where there is a possibility of carriers existing, the present invention can carry out efficient service carrier detection and out-of-zone measurement while omitting unnecessary cell searches, and greatly cut down the power consumption required for reverse-spreading in the cell search procedure, which can elongate the standby time of the mobile station apparatus.

What is claimed is:

1. A mobile station apparatus for detecting a carrier containing information necessary for a base station apparatus employing a CDMA scheme to shift to an in-zone standby state, said mobile station apparatus comprising:
    a measuring means for measuring received power of a received frequency $fm^i$ ($1 \leq i \leq I$), wherein i is the frequency number of the received frequency and I is the total number of frequencies;
    a limiting means for limiting a frequency range within which said carrier is to be sought to a limited frequency range containing a frequency $fm^j$ ($1 \leq j \leq I$, wherein j is the frequency number) having a measured received power that is greater than a predetermined value, and there is a frequency, J (J<I), within the limited frequency range;
    a control means for choosing a number of K frequencies (K<J) in said limited frequency range as candidates for said carrier; and
    a search means for carrying out a cell search for a number of K frequencies chosen as said candidates so as to detect said carrier.

2. A mobile station apparatus according to claim 1, wherein said control means selects a plurality of frequencies from within a frequency band where said carrier is assumed to exist, said measuring means measures a received power with a given bandwidth for each of said selected frequencies, and said limiting means limits said frequency range for seeking said carrier to the vicinity of a frequency where said measured received power exceeds a predetermined threshold.

3. A mobile station apparatus according to claim 2, wherein, when said measured received power does not exceed a predetermined threshold, so that said limiting means fails to limit said frequency range, said control means selects another frequency, and said measuring means measures a received power with a given bandwidth for each of said selected frequencies.

4. A mobile station apparatus according to claim 1, wherein said control means chooses as a candidate for said carrier a received signal frequency exceeding a predetermined power from within said frequency range limited by said limiting means.

5. A mobile station apparatus according to claim 1, wherein said control means chooses as candidates for said carrier a plurality of adjacent received signal frequencies exceeding a predetermined power from within said frequency range limited by said limiting means.

6. A mobile station apparatus according to claim 1, wherein, when notice information is received upon a cell search for a plurality of frequencies chosen as said candidates, said search means defines a received frequency thereof as a frequency of said carrier, while no cell search is carried out for the other candidate frequencies.

7. A mobile station apparatus according to claim 1, wherein, when the received power measured by said measuring means is not higher than a predetermined threshold, said control means determines that said mobile station apparatus is located out of a zone.

8. A mobile station apparatus according to claim 1, wherein said measuring means carries out a plurality of received power measuring operations with a given time interval for each frequency when measuring a received power, averages thus measured results for each frequency, and employs thus obtained average for each frequency as a measurement result at said frequency.

9. A mobile station apparatus according to claim 8, wherein, during an interval of received power measuring operations for one frequency, said measuring means measures a received power for another frequency.

10. A mobile station apparatus according to claim 1, wherein, while in a state where the existence of at least one said carrier is verified, said control means excludes the whole frequency band occupied by said verified carrier from a search range when detecting another carrier.

11. A mobile communication system comprising the mobile station apparatus according to claim 1, and a base station apparatus for carrying out a wireless communication with said mobile station apparatus.

12. A carrier detecting method for detecting in a mobile station apparatus a carrier containing information necessary for a base station apparatus employing a CDMA scheme to shift to an in-zone standby state, said method comprising:
    a measuring step of measuring a received power of a received frequency $fm^i$ ($1 \leq i \leq I$), wherein i is the frequency number of the received frequency and I is the total number of frequencies;
    a limiting step of limiting a frequency range within which said carrier is to be sought to a limited frequency range containing a frequency $fm^j$ ($1 \leq j \leq I$, wherein j is the frequency number) having a measured received power that I greater than a predetermined value, and there is a frequency, J (J<I), within the limited frequency range;
    a control step of choosing a number of K frequencies (K<J) in said frequency range limited by said limiting step as candidates for said carrier; and
    a search step of carrying out a cell search for a number of K frequencies chosen as said candidates in said control step so as to detect said carrier.

13. A carrier detecting method according to claim 12, wherein said control step selects a plurality of frequencies from within a frequency band where said carrier is assumed to exist, said measuring step measures a received power with a given bandwidth for each of said selected frequencies, and said limiting step limits said frequency range for seeking said carrier to the vicinity of a frequency where said measured received power exceeds a predetermined threshold.

14. A carrier detecting method according to claim 13, wherein, when said received power measured in said measuring step does not exceed a predetermined threshold, so that said limiting step fails to limit said frequency range, said control step selects another frequency, and said measuring step measures a received power with a given bandwidth for each of said selected frequencies.

15. A carrier detecting method according to claim 12, wherein said control step chooses as a candidate for said carrier a received signal frequency exceeding a predetermined power from within said frequency range limited by said limiting step.

16. A carrier detecting method according to claim 12, wherein said control step chooses as candidates for said carrier a plurality of adjacent received signal frequencies exceeding a predetermined power from within said frequency range limited by said limiting step.

17. A carrier detecting method according to claim 12, wherein, when notice information is received upon a cell search for a plurality of frequencies chosen as said candidates, said search step defines a received frequency thereof as a frequency of said carrier, while no cell search is carried out for the other candidate frequencies.

18. A carrier detecting method according to claim 12, wherein, when the received power measured in said measuring step is not higher than a predetermined threshold, said control step determines that said mobile station apparatus is located out of a zone.

19. A carrier detecting method according to claim 12, wherein said measuring step carries out a plurality of received power measuring operations with a given time interval for each frequency when measuring a received power, averages thus measured results for each frequency, and employs thus obtained average for each frequency as a measurement result at said frequency.

20. A carrier detecting method according to claim 19, wherein, during an interval of received power measuring operations for one frequency, said measuring step measures a received power for another frequency.

21. A carrier detecting method according to claim 12, wherein, while in a state where the existence of at least one said carrier is verified, said control step excludes the whole frequency band occupied by said verified carrier from a search range when detecting another carrier.

* * * * *